United States Patent [19]

Sutt

[11] 4,232,700
[45] Nov. 11, 1980

[54] METERING DEVICE

[76] Inventor: Iokhannes I. Sutt, ulitsa Vyistluse, 23/25, kv. 69, Tallin, U.S.S.R.

[21] Appl. No.: 926,817

[22] Filed: Jul. 21, 1978

[30] Foreign Application Priority Data

Jan. 17, 1978 [SU] U.S.S.R. .............................. 2562096

[51] Int. Cl.³ .......................................... G05D 11/08
[52] U.S. Cl. .................................... 137/93; 210/96.1; 261/64 B; 261/76
[58] Field of Search ......................... 137/93; 210/96.1; 261/64 R, 64 B, 76

[56] References Cited

U.S. PATENT DOCUMENTS

| 2,957,494 | 10/1960 | Stenberg . | |
| 3,528,545 | 9/1970 | Frazel | 137/93 UX |
| 3,826,905 | 7/1974 | Valkama | 137/93 X |

FOREIGN PATENT DOCUMENTS 292540 6/1973 U.S.S.R. .

Primary Examiner—Robert G. Nilson
Attorney, Agent, or Firm—Fleit & Jacobson

[57] ABSTRACT

A metering device for determining and controlling the content of a gas in a liquid, e.g. chlorine gas in water, comprises a pilot-operated check valve in a gas feed line, inserted between a vacuum diaphragm valve and an ejector. The metering device also comprises a concentration meter located on a main, a liquid flow meter, an electronic gas-to-liquid ratio setter correction controller coupled to a device for setting the concentration of the gas in the liquid, coupled to the concentration meter and coupled, via an actuating mechanism, to the gas-to-liquid ratio setter. Connected to the latter is an electronic gas-to-liquid flow ratio controller associated with signal distributors and an actuating mechanism of a gas flow controller. The invention permits the accuracy of metering a gas in a liquid, e.g. chlorine gas in drinking water, to be substantially enhanced, whereby the quality of drinking water is considerably improved.

11 Claims, 1 Drawing Figure

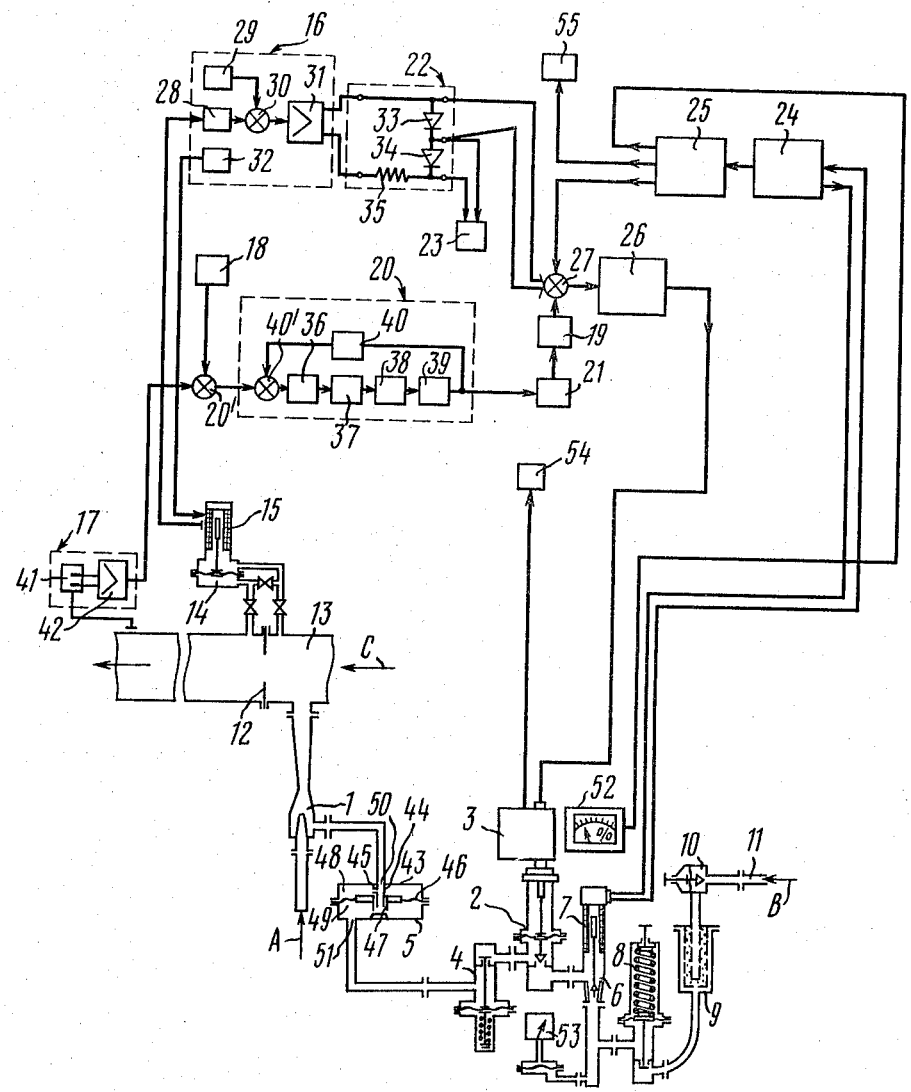

METERING DEVICE

FIELD OF THE INVENTION

The present invention relates to the apparatus industry, and more particularly to metering devices.

The invention can most advantageously be used in the chemical industry for metering gases in liquids and in the food industry for treating effluents and natural water.

BACKGROUND OF THE INVENTION

There is known a device for automatic metering of a gas in a liquid, e.g. chlorine in water, comprising an ejector for mixing gas with water, a gas flow controller, and a rotameter mounted on the gas feed line (cf. U.S. Pat. No. 2,957,494; Cl. 137-159).

This device fails to maintain a desired amount of chlorine in water, as the water flow varies, which results in a higher or lower concentration of chlorine in water.

Another known metering device (cf. USSR Inventor's Certificate No. 292,540; Cl. G 01 F) comprises an ejector for mixing gas with water, a gas flow controller with an actuating mechanism, a vacuum diaphragm valve coupled to the gas flow controller and pneumatically associated with the ejector. This prior art metering device also includes a rotameter with a differential inductive pickup, coupled to the gas flow controller and to a gas pressure controller mounted on the gas feed line. The metering device is further provided with a control circuit including a liquid flow meter with a restricting means arranged in the main and associated with a differential pressure gauge with a differential inductive pickup coupled to a converter.

The metering device also comprises a gas-to-liquid ratio setter electrically associated with the actuator of the gas flow controller.

The prior art device, however, does not provide for the required metering accuracy in the case of rapidly varying rate of absorption of the gas by the liquid and liquid flow rates.

SUMMARY OF THE INVENTION

It is an object of the present invention to enhance the accuracy of metering a gas in a liquid by improving the response of the controlling system.

The invention resides in that, in a metering device comprising an ejector for mixing a gas with a liquid, hydraulically associated with a main, a gas flow controller with an actuating mechanism, a vacuum diaphragm valve connected to the gas flow controller and pneumatically associated with the ejector, a rotameter with a differential inductive pickup, coupled to a gas pressure controller located on a gas feed line, a liquid flow meter including a restricting means arranged in the main and hydraulically associated with a differential pressure gauge with a differential inductive pickup coupled to a first converter, and a gas-to-liquid ratio setter electrically associated with the actuating mechanism of the gas flow controller, according to the invention, there are also provided a concentration meter located on the main at a distance from the ejector, sufficient for measuring the steady concentration of the gas in the liquid, a device for setting the concentration of the gas in the liquid, an electronic gas-to-liquid setter correction controller coupled to the device for setting the concentration of the gas in the liquid, to the concentration meter and, via an actuating mechanism, to the gas-to-liquid ratio setter, a first signal distributor coupled to the first converter and to a liquid flow meter, and a second converter coupled to the differential inductive pickup of the rotameter and to a second signal distributor, the electric coupling between the gas-to-liquid ratio setter and the actuating mechanism of the gas flow controller being through an electronic gas-to-liquid flow ratio controller coupled to the signal distributors, and the pneumatic coupling of the ejector to the vacuum diaphragm valve being through a pilot-operated check valve.

Preferably, the pilot-operated check valve should include a cylindrical body with a pipe connection passing through a first end wall of the body along its central axis and being spaced apart from a second end wall of the body, with a port being provided in the pipe connection near the first end wall of the body, and a diaphragm with a central hole accommodating a cylindrical sleeve intimately mating with the second end wall of the body, the diaphragm being mounted in the cylindrical body so that two equal spaces are formed between the end walls of the body and the diaphragm, with ports for letting the gas in and out, and the cylindrical sleeve and pipe connection being coaxially arranged.

It is expedient that the metering device be provided with a gas flow indicator intended for monitoring the gas flow, connected to the second signal distributor and located in the immediate proximity to the gas flow controller.

It is also expedient that the metering device be provided with a pressure gauge for checking the metering device and facilitating adjustment of the gas pressure controller, the pressure gauge being inserted between the rotameter and the gas pressure controller.

It is advisable that the metering device be provided with a gas flow meter connected to the second signal distributor and located in the immediate proximity to the device for setting the concentration of the gas in the liquid.

The proposed metering device permits the accuracy of metering a gas in a liquid to be substantially increased.

It does not require the permanent presence of an operator or a serviceman, which is a labour-saving feature.

When the proposed device is used at water treatment plants, substantial amounts of chlorine gas can be saved for it is no longer necessary to meter chlorine gas in amounts above the optimum limit, owing to the high accuracy and reliability of the device.

The metering device of the present invention is highly reliable in operation and can operate longer than a year without preventive maintenance.

The device is completely gas-tight, which precludes contamination of the automatic control and measurement room.

The use of the proposed metering device substantially improves the quality of liquid, e.g. drinking water.

BRIEF DESCRIPTION OF THE ACCOMPANYING DRAWING

The invention will now be described in greater detail with reference to a specific embodiment thereof, taken in conjunction with the accompanying drawing which is a functional diagram of a metering device according to the invention.

DETAILED DESCRIPTION OF THE INVENTION

Referring now to the drawing, the metering device comprises an ejector 1 for mixing a gas with a liquid, e.g. chlorine gas with water, hydraulically associated with a main, a gas flow controller 2 with an actuating mechanism 3, a vacuum diaphragm valve 4 coupled to the gas flow controller 2, and a pilot-operated check valve 5 coupled to the ejector 1 and the vacuum diaphragm valve 4.

The metering device also comprises a rotameter 6 with a differential inductive pickup 7, coupled to the gas flow controller 2 and to a gas pressure controller 8 associated, via a filter 9 and an inlet valve 10, with a gas feed line 11.

Arrow A indicates the direction in which the liquid is fed under pressure, while arrow B shows the direction of the gas feed.

The metering device further comprises a liquid flow meter including a restricting means 12 arranged in the main 13 (wherein arrow C shows the direction in which the liquid being metered is fed) and a differential pressure gauge 14 with a differential inductive pickup 15 coupled to a converter 16.

The metering device is also provided with a concentration meter 17 located on the main 13 at a distance from the ejector 1, sufficient for measuring the steady concentration of the gas in the liquid, a device 18 for setting the concentration of the gas in the liquid, a gas-to-liquid ratio setter 19, and an electronic gas-to-liquid ratio setter correction controller 20 coupled to the device 18 and to the concentration meter 17 via an adder 20', and coupled to the gas-to-liquid ratio setter 19 via an actuating mechanism 21.

There are further provided a signal distributor 22 coupled to the converter 16 and to a liquid flow meter 23, and a converter 24 coupled to the differential inductive pickup 7 of the rotameter 6 and to a signal distributor 25.

The metering device comprises an electronic gas-to-liquid flow ratio controller 26 coupled, via an adder 27, to the signal distributors 22 and 25 and the gas-to-liquid ratio setter 19.

The converter 24 is similar to the converter 16.

The latter includes a demodulator 28 and a corrector 29 connected via an adder 30 to a d-c amplifier 31. The converter 16 also includes a ferroresonant stabilizer 32 connected to the differential inductive pickup 15.

The signal distributors 22 and 25 are similar, each comprising two diodes 33 and 34 connected in series, with a resistor 35 being connected to the anode of one of the diodes.

The controllers 20 and 26 are also similar, each comprising a series circuit including a modulator 36, an a-c amplifier 37, a demodulator 38, and a magnetic amplifier 39 having its output connected, via a feedback unit 40 and an adder 40', to the input of the modulator 36.

The concentration meter 17 comprises a sensor 41 connected to a d-c amplifier 42.

The pilot-operated check valve 5 includes a cylindrical body 43 with a pipe connection 44 passing through a first end wall of the body 43 along its central axis and being spaced apart from a second end wall of the body 43, with a port 45 being provided near the first end wall of the body 43, and a diaphragm 46 with a central hole accommodating a cylindrical sleeve 47 intimately mating with the second end wall of the body 43.

The diaphragm 46 is so mounted in the cylindrical body 43 that two equal spaces 48 and 49 are formed between the end walls of the body 43 and the diaphragm 46, with ports 50 and 51 for letting the gas out and in, respectively. The cylindrical sleeve 47 and the pipe connection 44 are coaxially arranged.

The metering device further comprises a gas flow indicator 52 intended for monitoring the gas flow, coupled to the signal distributor 25 and arranged in the immediate proximity to the gas flow controller 2.

The metering device is also provided with a pressure gauge 53 for checking the metering device and facilitating adjustment of the gas pressure controller 8; the pressure gauge 53 is inserted between the rotameter 6 and the gas pressure controller 8.

Finally, the metering device comprises an indicator 54 of the position of the controller 2, associated with the actuating mechanism 3, and a gas flow meter 55 coupled to the signal distributor 25 and located in immediate proximity to the device 18 for setting the concentration of the gas in the liquid.

The proposed metering device operates as follows:

Gas is fed in from the gas feed line 11 through the inlet valve 10 and filter 9. The latter removes mechanical impurities from the gas. The gas pressure is maintained constant with the aid of the controller 8. The rotameter 6 with the differential inductive pickup 7 measures the gas flow. Then, the gas flows through the gas flow controller 2, the vacuum diaphragm valve 4 (which is only opened in case a vacuum is created between the valve 4 and the ejector 1), and the check valve 5 into the ejector 1 wherein it is mixed with the liquid fed in the direction indicated by arrow A, the resulting gas-liquid mixture entering the main flow path indicated by arrow C.

Thereafter, the liquid and gas flow rates are measured.

The amount of the passing gas is measured by means of the differential inductive pickup 7 mounted on the rotameter 6 and the converter 24, the latter applying a signal via the distributor 25 to the electronic gas-to-liquid flow ratio controller 26 (via adder 27), to the indicator 52, and to the gas flow meter 55.

The liquid flow rate is measured with the aid of the restricting means 12, the differential pressure gauge 14 with the differential inductive pickup 15, and the converter 16, from which the measuring signal is applied via the distributor 22 to the electronic gas-to-liquid flow ratio controller 26 (via adder 27) and to the flow meter 23. The required ratio of the gas to the liquid is established with the aid of the gas-to-liquid ratio setter 19.

If the balance of the gas-to-liquid ratios is disturbed, the input of the electronic controller 26 receives an error signal from the adder 27.

At the output of the electronic controller 26 a signal is produced which is applied to the actuating mechanism 3 of the gas flow controller 2 until the gas-to-liquid ratio balance is restored.

The required concentration of the gas in the liquid is set by means of the device 18. A signal representative of the desired gas concentration is applied from the output of the setting device 18 via adder 20' to the electronic controller 20 which also receives a signal representative of the actual concentration of the gas in the liquid, the latter signal being applied from the concentration meter 17 via adder 20'. These signals are compared, and, if the actual concentration differs from the desired one, a signal is applied from the electronic controller 20, via the actuating mechanism 21, to the gas-to-liquid ratio setter 9, whereafter the gas-to-liquid ratio is corrected in the setter 19 by time integration. The integration time depends on the time it takes for the liquid to flow from the point of introduction of the gas-liquid mixture into the liquid up to the concentration meter 17.

The metering of a gas into a liquid is effected, depending on a preset gas-to-liquid ratio, almost instantaneously, and the gas-to-liquid ratio is corrected depending on the preset and actual concentrations of the gas in the liquid, whereby the accuracy of metering is substantially improved.

Consider now the operation of the check valve 5. In the initial state, the cylindrical sleeve 47 intimately mates with an end wall of the valve body 43. As soon as the gas is fed in, a pressure differential occurs across the diaphragm 46 with the result that the membrane 46 is displaced together with the cylindrical sleeve 47, and the gas is free to flow into the pipe connection 44 and further into the ejector 1. Such a design of the valve does not permit the liquid to flow to the controller 2 and the rotameter 6, which ensures high accuracy of measuring and controlling the gas feed.

The converter 16 operates in the following manner: The a-c voltage from the differential inductive pickup 15 is converted by the demodulator 28 to a d-c voltage and is added to the voltage of the corrector 29. The resultant signal is amplified by the d-c amplifier 31 at the output of which d-c signal is produced, the d-c signal being proportional to the liquid flow rate.

The controller 20 operates as follows: The input of the controller 20 receives the signal resulting from comparison of the signals representative of the desired and actual concentration of the gas in the liquid. This signal is converted by the modulator 36 to an a-c signal, and amplified by the amplifier 37, and the input of the magnetic amplifier 39 receives the amplified direct current rectified by the demodulator 38. At the output of the magnetic amplifier 39 a pulse signal of adjustable width and relative duration is produced, which pulse signal is applied to the actuating mechanism 21.

The pressure gauge 53 permits the metering device to be checked and facilitates adjustment of the gas flow controller 8.

The present invention enables the accuracy of metering a gas in a liquid, e.g. chlorine gas in drinking water, to be considerably enhanced, which substantially improves the drinking water quality.

What is claimed is:

1. In a metering device determining and controlling the content of a gas in a liquid fed through a main, comprising:
   an ejector for mixing said gas with said liquid, hydraulically associated with said main;
   a first actuating mechanism;
   a gas flow controller coupled to said first actuating mechanism;
   a vacuum diaphragm valve coupled to said gas flow controller and pneumatically associated with said ejector;
   a line for feeding said gas;
   a gas pressure controller located on said gas feed line;
   a first differential inductive pickup;
   a rotameter coupled to said first differential inductive pickup for measuring the flow rate of said gas;
   said rotameter being coupled to said gas flow controller and to said gas pressure controller;
   a restricting means arranged in said main;
   a second differential inductive pickup;
   a first converter;
   a differential pressure gauge hydraulically associated with said restricting means and coupled to said second differential inductive pickup;
   said restricting means, said differential pressure gauge, said second differential inductive pickup, and said first converter comprising a liquid flow meter;
   the improvement comprising:
   a concentration meter located on said main at a distance, from said ejector, sufficient for measuring the steady concentration of said gas in said liquid;
   a device for setting the concentration of said gas in said liquid;
   a gas-to-liquid ratio setter;
   a second actuating mechanism coupled to said gas-to-liquid ratio setter;
   an electronic gas-to-liquid ratio setter correction controller coupled to said device for setting the concentration of said gas in said liquid, coupled to said concentration meter, and coupled, via said second actuating mechanism, to said gas-to-liquid ratio setter;
   a liquid flow meter;
   a first signal distributor coupled to said first converter and to said liquid flow meter;
   a second signal distributor;
   a second converter coupled to said first differential inductive pickup and to said second signal distributor;
   an electronic gas-to-liquid flow ratio controller connected between said gas-to-liquid ratio setter and first said actuating mechanism, and coupled to said first and second signal distributors; and
   a pilot-operated check value connected between said ejector and said vacuum diaphragm valve.

2. A metering device as claimed in claim 1, wherein said pilot-operated check valve comprises:
   a cylindrical body having first and second end walls and a central axis; a pipe connection passing through said first end wall of said cylindrical body along said central axis of said cylindrical body, spaced apart from said second end wall of said cylindrical body and provided with a port near said first end wall of said cylindrical body;
   a diaphragm with a central hole, arranged in said cylindrical body so that two equal spaces are formed between said first and second end walls of said cylindrical body and said diaphragm, with ports for letting said gas in and out;
   a cylindrical sleeve accommodated in said central hole of said diaphragm, intimately mating with said second end wall of said cylindrical body;
   said cylindrical sleeve and said pipe connection being coaxially arranged.

3. A metering device as claimed in claim 1, wherein there is provided a gas flow indicator intended for monitoring the gas flow, connected to said second signal distributor and located in immediate proximity to said gas flow controller.

4. A metering device as claimed in claim 2, wherein there is provided a gas flow indicator intended for monitoring the gas flow, connected to said second signal distributor and located in immediate proximity to said gas flow controller.

5. A metering device as claimed in claim 1, wherein there is provided a pressure gauge for checking the metering device and facilitating adjustment of said gas pressure controller, said pressure gauge being inserted between said rotameter and said gas pressure controller.

6. A metering device as claimed in claim 2, wherein there is provided a pressure gauge for checking the metering device and facilitating adjustment of said gas pressure controller, said pressure gauge being inserted between said rotameter and said gas pressure controller.

7. A metering device as claimed in claim 3, wherein there is provided a pressure gauge for checking the metering device and facilitating adjustment of said gas pressure controller, said pressure gauge being inserted between said rotameter and said gas pressure controller.

8. A metering device as claimed in claim 1, wherein there is provided a gas flow meter coupled to said second signal distributor and located in immediate proximity to said device for setting the concentration of said gas in said liquid.

9. A metering device as claimed in claim 2, wherein there is provided a gas flow meter coupled to said second signal distributor and located in immediate proximity to said device for setting the concentration of said gas in said liquid.

10. A metering device as claimed in claim 3, wherein there is provided a gas flow meter coupled to said second signal distributor and located in immediate proximity to said device for setting the concentration of said gas in said liquid.

11. A metering device as claimed in claim 4, wherein there is provided a gas flow meter coupled to said second signal distributor and located in immediate proximity to said device for setting the concentration of said gas in said liquid.

* * * * *